United States Patent
Kim

(10) Patent No.: US 6,167,843 B1
(45) Date of Patent: Jan. 2, 2001

(54) ANIMAL TRAINING SYSTEM

(76) Inventor: J. S. Kim, 2872 Walnut Hill La., Dallas, TX (US) 75229

( * ) Notice: Under 35 U.S.C. 154(b), the term of this patent shall be extended for 0 days.

(21) Appl. No.: 09/245,867

(22) Filed: Feb. 8, 1999

(51) Int. Cl.[7] .................................................. A01K 15/02
(52) U.S. Cl. ............................................ 119/720; 119/859
(58) Field of Search ...................................... 119/720, 712, 119/719, 859, 908; 340/573; 361/232

(56) References Cited

U.S. PATENT DOCUMENTS

| | | | |
|---|---|---|---|
| 3,589,337 | * 6/1971 | Doss ..................................... | 119/720 |
| 4,180,013 | 12/1979 | Smith . | |
| 4,335,682 | * 6/1982 | Gonda et al. ........................ | 119/719 |
| 4,802,482 | * 2/1989 | Gonda et al. ........................ | 119/720 |
| 4,898,120 | 2/1990 | Brose . | |
| 5,161,485 | 11/1992 | McDade . | |
| 5,193,484 | 3/1993 | Gonda . | |
| 5,207,178 | 5/1993 | McDade et al. . | |
| 5,381,129 | 1/1995 | Boardman . | |
| 5,425,330 | 6/1995 | Touchton et al. . | |
| 5,465,687 | * 11/1995 | Custer .................................... | 119/719 |
| 5,575,242 | 11/1996 | Davis et al. . | |
| 5,605,116 | * 2/1997 | Kim et al. ............................. | 119/720 |
| 5,934,225 | * 8/1999 | Williams ............................... | 119/859 |
| 6,019,066 | * 2/2000 | Taylor ................................... | 119/720 |

* cited by examiner

Primary Examiner—Peter M. Poon
Assistant Examiner—Yvonne R. Abbott
(74) Attorney, Agent, or Firm—Jones, tullar & Cooper, P.C.

(57) ABSTRACT

A remote animal training system is described which allows training signals to be sent from a trainer's remote transmitter to a receiver attached to the animal. The trainer may send a short shock, a continuous shock or a vibration signal or a combination of these signals to the animal by selecting the signal mode desired. The unique receiving antenna is an insulated wire antenna woven into the fabric of the attaching collar which protects the antenna from damage from the elements or physical abuse.

5 Claims, 5 Drawing Sheets

ANIMAL TRAINING SYSTEM

FIELD OF THE INVENTION

This invention relates in general to animal training systems and in particular to electronic animal training systems using a remote electronic transmitter to convey commands or command reinforcement signals to an electronic receiver attached to the animal.

BACKGROUND OF THE INVENTION

Electronic training systems are useful in the training of domestic animals to obey commands when the animal is not connected to the trainer by a leash or other physical restraint system. Since the training of a domestic animal may involve multiple aspects, it is preferred to have more than one command available to the trainer in order to impart different levels of stimulation to the animal during the training process. For example, one system, described in U.S. Pat. No. 5,605,116, allows the trainer to give verbal commands or electric shocks to the animal from a remote transmitter. While this capability is helpful, in some environments, where ambient noise is high, it has been found that verbal commands may be drowned out or misunderstood by the animal. The electric shocks, while somewhat effective, are found objectionable by some people because to be effective the shock level is perhaps higher than they would like.

Another feature of such a system is that when the receiver is a part of an animal collar an antenna is required. Typically, the antenna has been a semi rigid stick-like antenna of 5 or 6 inches in length. This type of antenna can easily be caught on stationary objects such as trees or brush and be damaged or torn completely from the receiver. When this occurs all control functions of the system are lost.

Thus there is a need for an electronic remote training system capable of transmitting a variety of training commands and being of a construction capable of surviving in the training environment.

SUMMARY OF THE INVENTION

The present invention provides a training system capable of transmitting a variety of commands with a system of rugged and reliable construction. This system provides both an adjustable electric shock command and a vibration command to a receiving collar attached to the animal. These commands may be applied separately or in several combinations and durations. In order to avoid damage to the receiving antenna, the antenna wire is incorporated into a collar structure by weaving the antenna wire into the center core portion of the collar. Thus, the antenna is contained in a weatherproof structure and is entirely internal to the collar covering and is thus protected from physical damage from the training environment. Additionally, the system transmitter can include more than one set of signal generators operating on different frequencies with switching means to select the transmitting frequencies. This features allows the control of at least two animals from a single system transmitter when the system receivers are tuned to different frequencies.

BRIEF DESCRIPTION OF THE DRAWINGS

Four figures have been selected to illustrate a preferred embodiment of the present invention. These figures and the corresponding description that follows is believed to be sufficient for those skilled in the art to practice the invention.

DETAILED DESCRIPTION OF THE PREFERRED EMBODIMENT

Figure 1A:
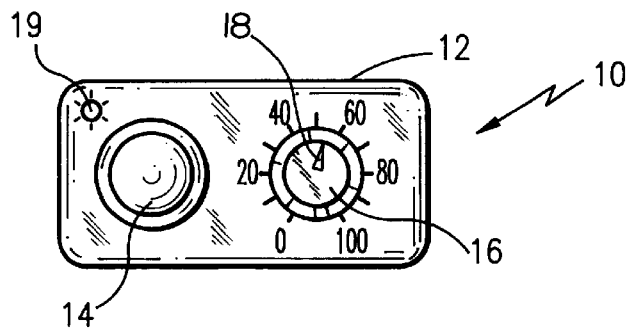
FIG. 1A is a top view of a system transmitter according to the present invention.
Figure 1B:
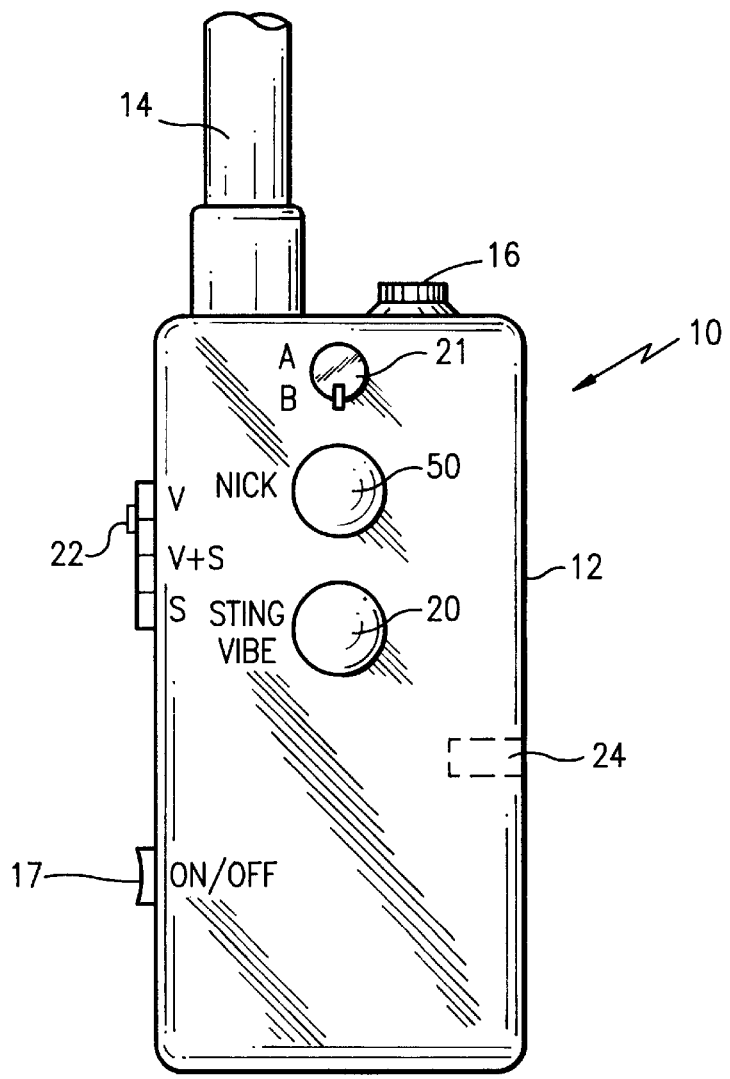
FIG. 1B is a front view of the system transmitter of FIG. 1.

Referring now to FIGS. 1A and 1B, there are shown two views of the system transmitter 10 of the present invention. In FIG. 1A, the outer case 12 is of metal or plastic or other durable material for containing the system transmitter components. A transmitting antenna 14 is of conventional design and can be removed for storage by unscrewing it from the top of the outer case. Also on the top of the case 12 is a dial 16 having a pointer 18 which is rotatable from a setting of 0 to 100 to adjust the level of the training signal, which will be described in detail later. An indicator light 19 is provided to inform the operator whether or not the system is energized and ready for use.

On the front face of the case 12 as shown in FIG. 1B are three controls. Push button 50, labeled "NICK" causes the system transmitter to send a momentary shock signal to the system receiver. Push button 20, labeled "STIMU" and "VIBE" causes the system transmitter to send a variety of training signals or combination of signals depending on the position of a slide switch 22 located on the side of the outer case 12. Slide switch 22 has three positions marked "V,", "V+S" and "S". The details of the functions shown will be explained in detail in the description of the operation of the system below. A receptacle 24 is provided to allow recharging of the battery of the system transmitter 10. In one embodiment of the present invention, two transmitting circuits are provided which operate on different frequencies. A switch 21 is provided to allow the operator to select frequency A or frequency B. With this option, two animals can be trained at the same time with each system receiver operating on one or the other of the transmitted signal frequencies.

Figure 2:
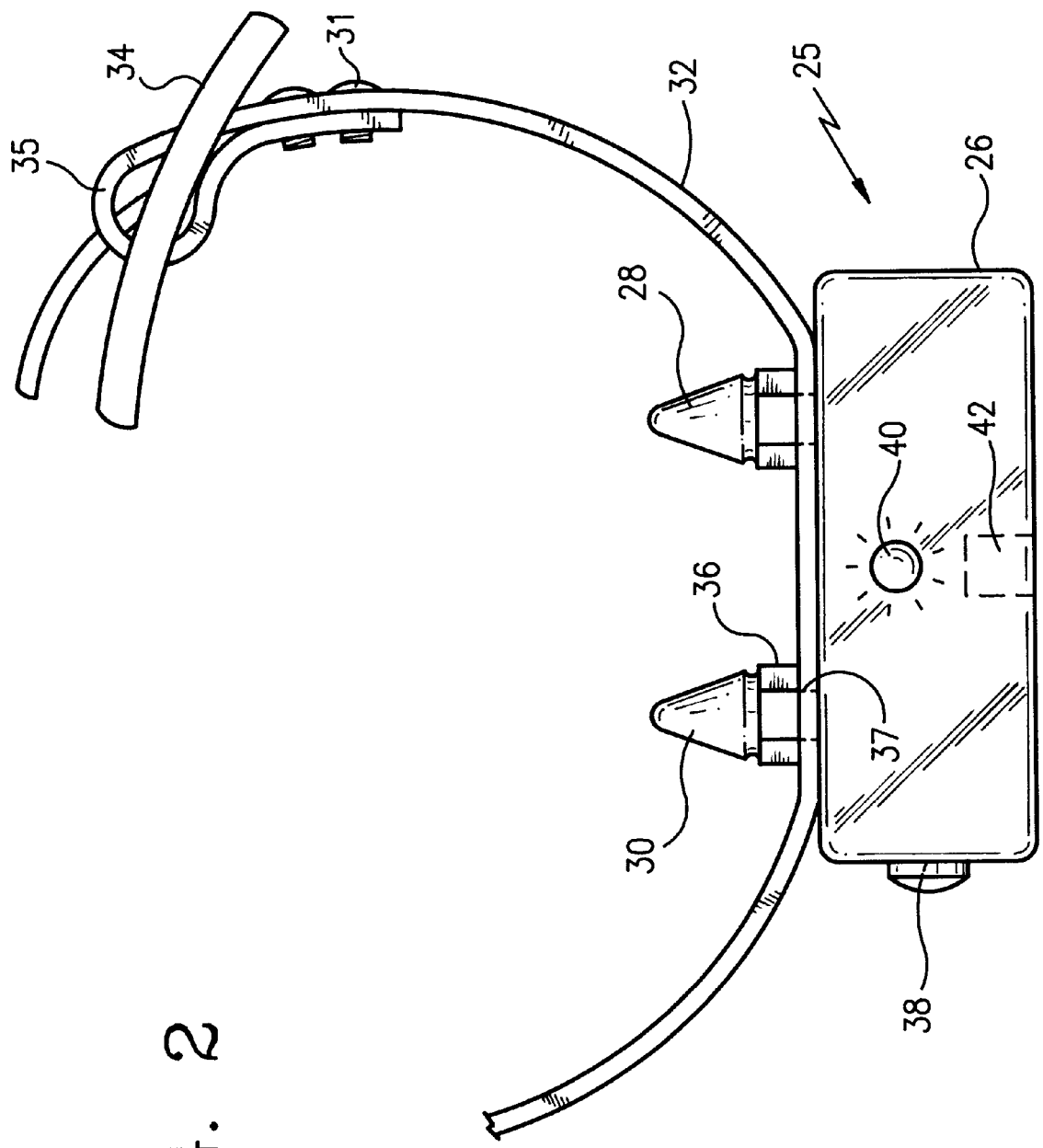
FIG. 2 is a top view of a system receiver and a portion of the attachment means according to the present invention.

Referring now to FIG. 2, there is shown the system receiver 25 of the present invention. The system receiver 25 is contained in an outer case 26 of similar construction as the outer case 12 of the system transmitter. Attached to the outer case 26 are two electrodes 28 and 30. These electrodes are attached to the outer case 26 by means of, for example, hexagonal nuts 36 in a conventional manner. The means for attaching the system receiver to the animal is a collar 32 constructed similar to a regular dog collar for example. The collar 32 is attached to the system receiver 25 by the hexagonal nuts 36 which are screwed onto studs 37 extending from the outer case 26. The studs extend through the collar 32 as shown. On one end of the outer case 26 is a ON/OFF power button 38 for energizing the system. An indicator light 40 informs the operator of the system that the system is energized and ready for use. A receptacle of conventional design is provided for recharging the battery of the system receiver. The collar 32 forma at at least one end, a loop 35 utilizing rivets 31.

Figure 3A:
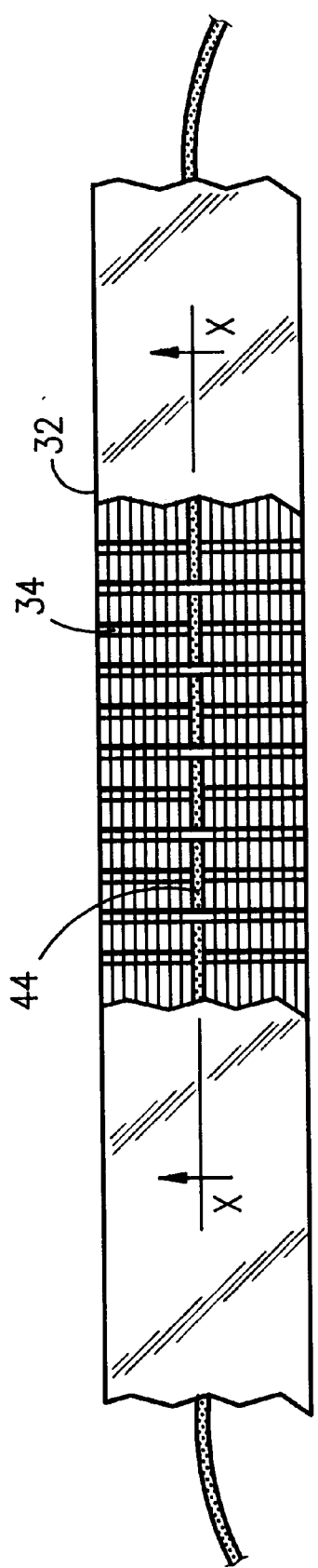
FIG. 3A is a partial view of the attachment collar according to the present invention revealing the internal insulated antenna wire.
Figure 3B:
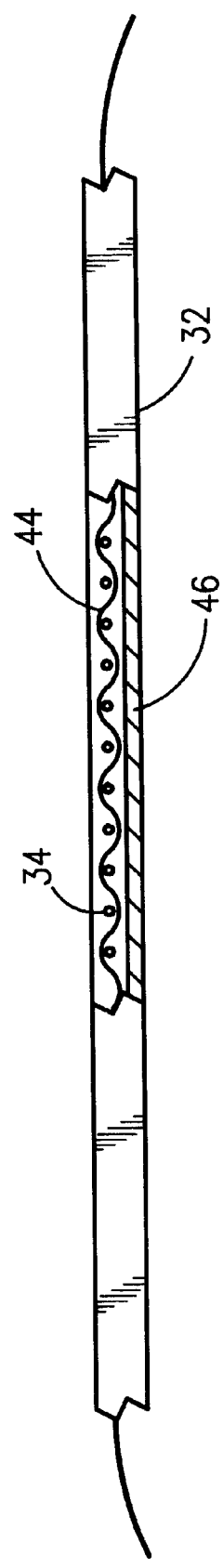
FIG. 3B is a partial sectional view of the collar of FIG. 3A.

Referring now to FIGS. 3A and 3B, the details of the attaching collar 32 of the system receiver 25 are illustrated. In FIG. 3A a portion of the attaching collar is cut away to show the details of the collar construction. By way of illustration, the core 34 of the collar 32 is shown as a woven material such as nylon of conventional manufacture. The receiving antenna 44 of the system receiver 25 is incorporated into the woven structure of the collar core 34. The antenna wire 44 replaces some of the longitudinal fibers of the core 34 and becomes an integral part of the collar structure. In a partial cross sectional view in FIG. 3B, the antenna 44 is shown as a part of the woven structure. The outer coating of the collar 32 can be of various materials suitable for the application. The outer coating 46 may be of upper and lower leather stitched together as in typical dog collars or may be a plastic weatherproof coating which maybe sprayed on the core 34 or applied by dipping the core 34 into liquid coating material.

Figure 4A:
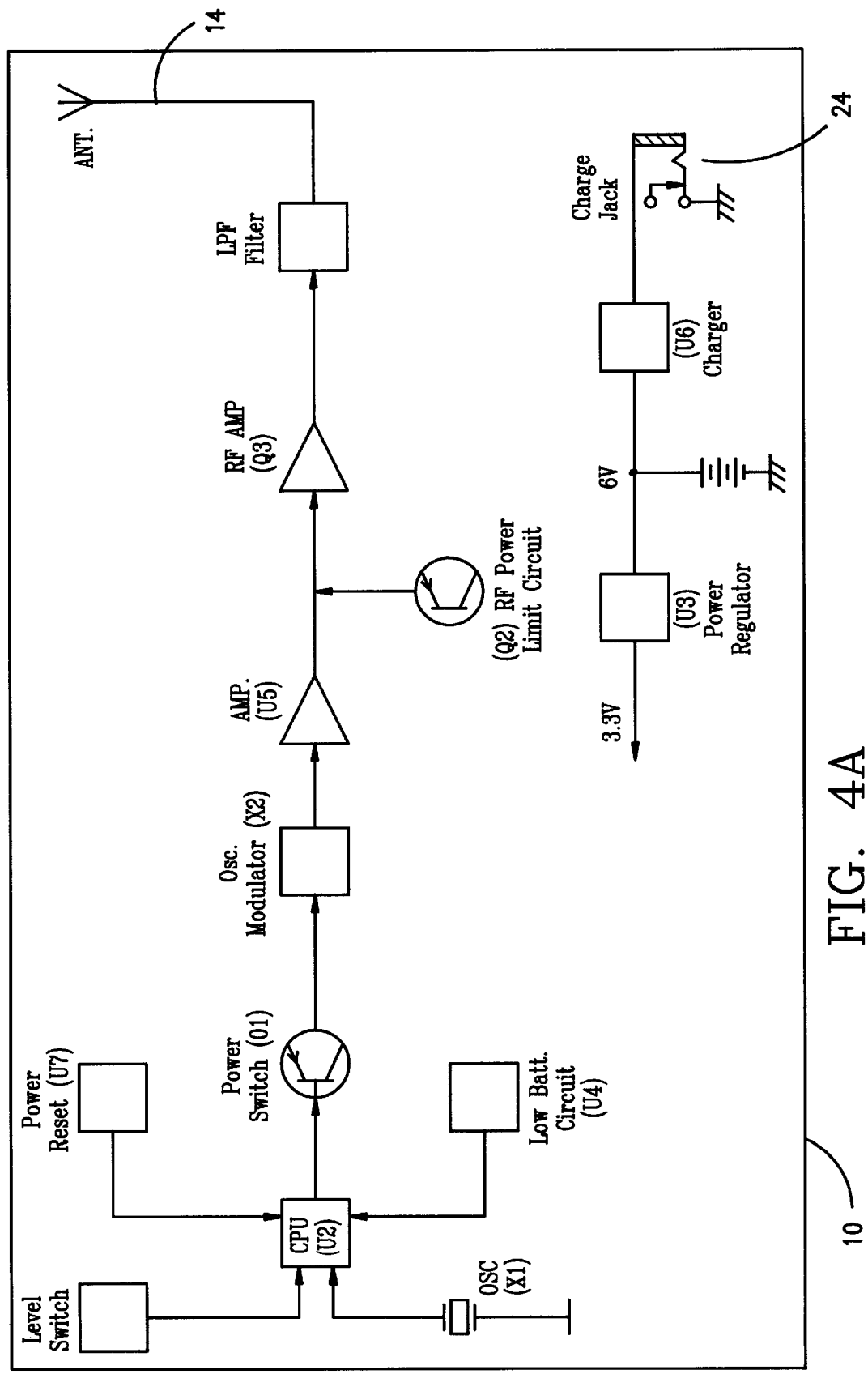
FIG. 4A is a functional diagram of the electronic circuit of the transmitter.
Figure 4B:
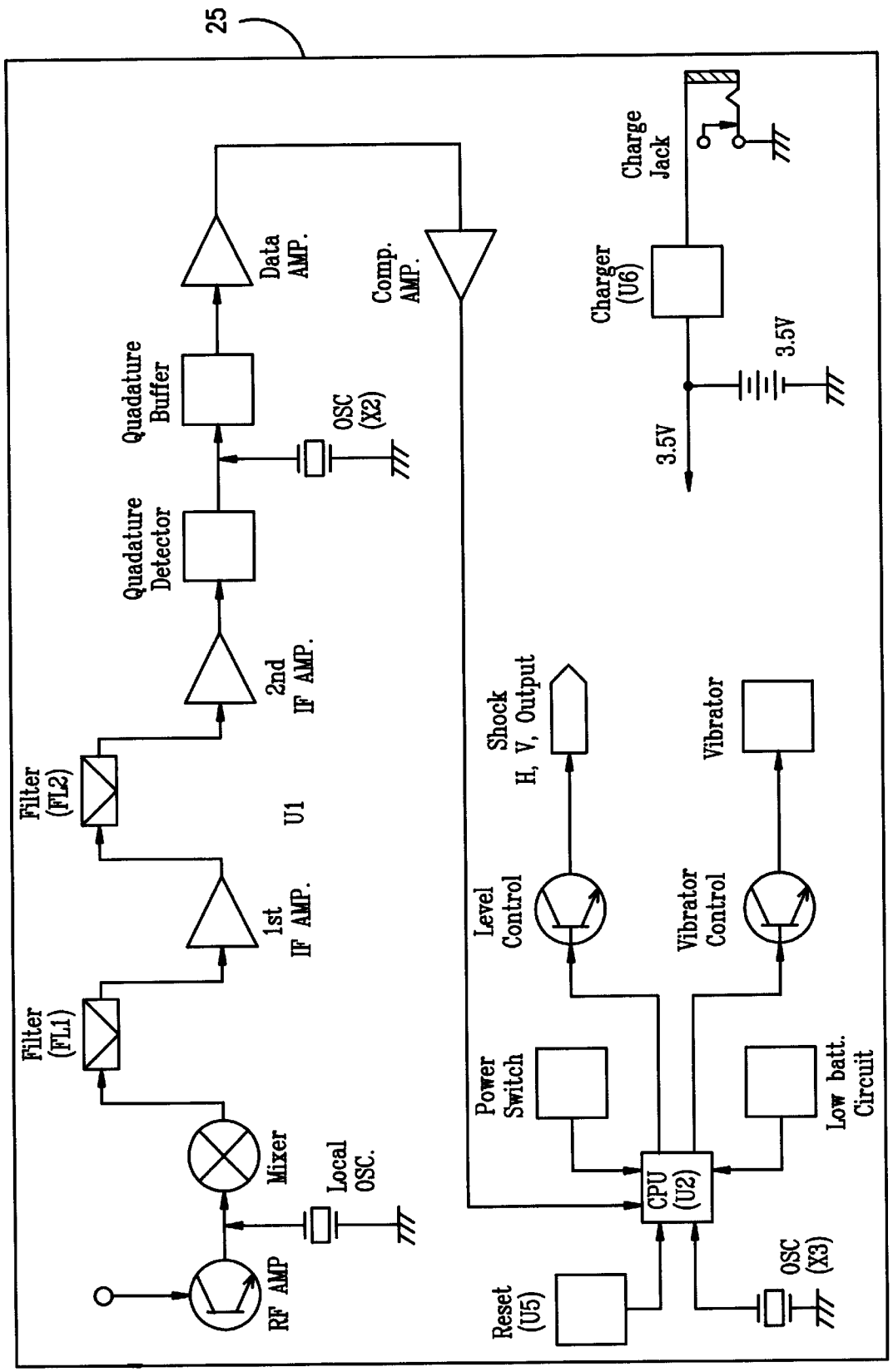
FIG. 4B is a functional diagram of the electronic circuit of the system receiver

FIGS. 4A and 4B illustrate a functional representation of the electronic circuits of the system transmitter 12 and the system receiver 25. A detailed description of each circuit component is not necessary since the arrangement can be easily understood by one skilled in the art.

OPERATION OF THE INVENTION

The operation of the training system illustrated is as follows. Turn on the system receiver 25 by pressing button 38 on the end of the receiving unit case 26. Hold the button 38 until the light 40 starts flashing and attach the system receiver to the animal by means of collar 32. Attach antenna 14 to the system transmitter 10 turn on the system transmitter 10 by pressing button 17 and adjust the voltage between 10 and 60 by means of dial 16. Select transmitter frequency A or B by means of switch 21. Depressing button 18 at any time will send a small short shock signal to the system receiver. With the slide switch 22 in the upper "V" position, depressing the STIMU/VIBE switch 20 will administer only a vibration signal to the receiver. With switch 22 in the center "V+S" position, depressing the STIMU/VIBE switch 20 the transmitter will send both a continuous shock signal and a vibration signal. With the slide switch 22 in the lower "S" position, depressing the STIMU/VIBE switch 20 will cause the transmitter to send only a continuous shock signal.

What is claimed is:

1. An animal training system, comprising:

a transmitter;

a receiver;

attaching means for attaching said receiver to an animal;

first and second switch means in said transmitter;

shock signal transmitting means mounted in said transmitter for a shock signal to said receiver in response to the activation of said first switch means;

vibration means assembled in said receiver;

vibration signal transmitting means for transmitting a vibration signal to said vibrator means in response to activation of said second switch means;

at least one shocking electrode in contact with the animal when said receiver is attached to the animal; and receiving antenna means incorporated as an integral part of said attachment means for receiving signals from at least one of said shock signal transmitting means and said vibration signal transmitting means, wherein said attachment means comprises:

a collar for encircling the neck of an animal, said collar comprised of a center layer and first and second outer layers, said center layer being of a woven material and having said receiving antenna means woven into the woven material of said center layer, said first and second outer layers surrounding said center layer to form a weatherproof coating for said center layer; and closure means at the ends of said collar for connecting the ends of said collar around the neck of the animal.

2. An animal training system, comprising:

a transmitter;

a receiver;

attachment means for attaching said receiver to an animal;

first and second switch means in said transmitter;

shock signal transmitting means mounted in said transmitter for transmitting a shock signal to said receiver in response to the activation of said first switch means;

vibrator means assembled in said receiver;

vibration signal transmitting means for transmitting a vibration signal to said vibrator means in response to activation of said second switch means;

at least one shocking electrode in contact with the animal when said receiver is attached to the animal;

receiving antenna means incorporated as an integral part of said attachment means for receiving signals from at least one of said shock signal transmitting means and said vibration signal transmitting means; and a mode selector switch having at least two mode positions, in the first of said positions activation of said second switch means causes a vibration signal to be transmitted to said receiver and in the second of said positions, activation of said second switching means causes a combined shock signal and vibration signal to be transmitted to said receiver.

3. The animal training system according to claim 2, wherein the second of said mode selector switch positions causes continuous vibration and shock signals to be transmitted to said receiver.

4. The animal training system according to claim 3, wherein said mode selector switch has a third position, said third position causes only a continuous shock signal to be transmitted to said receiver.

5. An animal training system, comprising:

a transmitter for transmitting training signals to a remote receiver;

a remote receiver having attachment means for attaching said receiver to an animal for receiving training signals, said attachment means comprising a receiving antenna and a collar for encircling the neck of an animal, said collar comprised of a center layer and first and second outer layers, said center layer being of a woven material and having said receiving antenna woven into the woven material of said center layer, said first and second outer layers surrounding said center layer to form a weatherproof coating for said center layer; and closure means at the ends of said collar for connecting the ends of said collar around the neck of the animal.

* * * * *